United States Patent [19]

Slocum

[11] Patent Number: 5,321,055

[45] Date of Patent: Jun. 14, 1994

[54] PROCESS FOR THE PREPARATION OF A SYNTHETIC QUARTZITE-MARBLE/GRANITE MATERIAL

[76] Inventor: Donald H. Slocum, Unit 24, Stonybrook, Luce Hill Rd., Stowe, Vt. 05672

[21] Appl. No.: 472,757

[22] Filed: Jan. 31, 1990

[51] Int. Cl.$^5$ .............................................. C09D 5/29
[52] U.S. Cl. ................................... 523/171; 523/514; 524/437
[58] Field of Search ................. 523/171, 514; 524/437

[56] References Cited

U.S. PATENT DOCUMENTS

| | | | |
|---|---|---|---|
| 4,257,817 | 3/1981 | Marthur et al. | 523/457 |
| 4,269,798 | 5/1981 | Ives | 264/73 |
| 4,352,897 | 10/1982 | Ogata et al. | 523/220 |
| 4,397,965 | 8/1983 | Stolt | 521/138 |
| 4,529,757 | 7/1985 | Isler et al. | 523/514 |
| 4,643,921 | 2/1987 | Terabe et al. | 428/15 |
| 4,743,644 | 5/1988 | Skipper et al. | 524/437 |
| 4,766,163 | 8/1988 | Strudwick | 524/437 |
| 4,916,172 | 4/1990 | Hayashi et al. | 523/171 |
| 4,916,752 | 4/1990 | Hayashi et al. | 523/171 |

*Primary Examiner*—Paul R. Michl
*Assistant Examiner*—Edward Cain
*Attorney, Agent, or Firm*—McGlew and Tuttle

[57] ABSTRACT

The invention provides a polyester resin for use in making synthetic quartzite-marble/granite, comprising: a mix of NPG-isophthalic and PG-orthophthalic resin. An article and a process for forming the article is disclosed. The article includes 40% to 70% of a solution including a mixed monomer and the polyester resin absorbed in a monomer mixture of 2:1 styrene to methyl methacrylate where the total monomer comprises 30% of the solution; 30% to 50% of alumina trihydrate; 10% to 30% of a filler, the filler having a size range of 24 mils to ¼"; approximately 1% of a peroxide that is stable at room temperature; and, adding a small amount of a pigment or dye.

19 Claims, No Drawings

PROCESS FOR THE PREPARATION OF A SYNTHETIC QUARTZITE-MARBLE/GRANITE MATERIAL

BACKGROUND OF THE INVENTION

1. Field of the Invention

The invention relates to tho production of structural filled plastic material from mixed polymers and fillers and a method of curing and manufacturing the same. The invention relates more particularly to a material having the appearance of a marble and/or granite with improved properties compared to other natural or synthetic materials.

2. Description of the Prior Art

Polished natural stone, such as marble or granite and other igneous forms of crystalline silica or siliceous rock, is used as decorative and functional facing and surfaces in long-lasting construction applications. However, these products require expensive handling in shaping and finishing and are only available from more remote regions. These factors significantly add to the already high cost of employing such materials. Additionally, due to imperfections, cracking and general brittleness can be encountered and the porosity of the material can lead to staining and water marking upon use.

Various synthetic-filled polymeric compositions have been described as useful for end uses such as counter tops, floors, facings and other construction end uses. These synthetic materials have become commercially available. These materials incorporate resin and inorganic fillers generally, and are cured using curing systems that are actuated at room temperature or under similar ambient conditions.

Certain synthetic products have become available which provide the appearance of natural marble. These so-called cultured marble products are man-made molded products generally consisting of resin highly filled with inorganic particles and pigments. These materials are highly porous and necessarily require gel coats as castings made without gel coats are susceptible to stress cracking and have a tendency to stain. Most of these materials retain the properties of the plastic matrix and are subjected to some hot water whitening due to fissure of the filler/resin bond, and/or undercured or incompletely cured resin (containing residual monomer).

SUMMARY AND OBJECT OF THE INVENTION

It is an object of the invention to provide a hard, well cured, structural material that simulates marble and/or granite that requires no gel coat and is free of air incorporation.

A further object of the invention is to provide a method for making such material which relies upon specific cure systems and preparation of the admixture to achieve proper appearance and final properties.

According to the invention, the synthetic marble/granite material is comprised of:

A. About 40 to 70% by volume of a polymer made from polyester having the following composition:

(1) 70% mix of orthophthalic acid and 25% isophthalic acid (equal portions by weight) that is added to fumaric acid anhydride and maleic acid anhydride and reacted with propylene glycol and neopentyl glycol in a 50/50 ratio such that the aromatic anhydride mix is 75% of the total aromatic/aliphatic anhydride concentration the total aromatic compounds such as isophthalic and/or orthophthalic acids or anhydrides and alipahatic components such as fumaric and/or maleic acids or anhydrides and such that the total acid and anhydrides are 75% of the total anhydride/polyhydric alcohol content. The polyester is prepared by standard processes.

For example, the manufacture of polyester may be carried out in large stainless-steel lined kettles which are provided with overhead fractionating columns to reduce the loss of components that are less volatile than water. The columns normally are packed and steam-jacketed. The widely used manufacturing method is the direct fusion process.

The direct fusion process prepares unsaturated polyesters by a poly condensation reaction at elevated temperatures between glycols and dibasic acids or anhydrides. Once the various glycols and acids or anhydrides are weighed and charged into a kettle, they are constantly agitated and heated until a predetermined range of acid value-viscosity has been obtained. In the initial phases of the reaction, the drop in the acid value is rapid and the increase in the viscosity is quite slow. Toward the latter stages of the reaction, the reverse is true. After the polyester is prepared, it is inhibited and diluted with the monomer either by direct, reverse or continuous methods.

In the direct thinning method, the hot polyester is transferred from the reaction kettle to a thinning tank and is cooled to 100°–110° C. The inhibitor is added followed by monomer addition to a form a solution which is cooled to room temperature. This method is usually practiced when the viscosity of the undiluted polyester at 110° C. is low and its miscibility with the diluting monomer is facile. However, if the viscosity of the cooled polyester is high so as to present agitation problems or cause precipitation when the cold monomer is introduced, reverse thinning is employed. In this operation, the polyester is added to the monomer directly from the reaction kettle at a rate such that a homogeneous solution is obtained. Depending on the solubility of the polyester in the monomer, slight heating of the monomer prior to polyester addition may be required. In reverse thinning, the inhibitors are added to the styrene monomer prior to contact with the hot polyester. Once the solution if formed, it is cooled rapidly. In the continuous method of thinning, the polyester is cooled, inhibited, and mixed continuously with the monomer. The product is discharged into a holding tank and cooled before final adjustments.

Another method for preparing unsaturated resins is the oxide method which entails the use of monoepoxide raw materials, eg, ethylene or propylene oxide, and maleic of mixtures of maleic anhydride and saturated anhydrides. Glycols of dibasic acids are used in this process as reaction initiators. If a glycol is used, the half ester of the anhydride is formed first followed by reaction of the carboxyl group with the oxirane ring to generate a hydroxyl group; which reacts with the anhydride, thereby continuing the cycle and promoting chain growth. If a dibasic acid is used, the first reaction is the opening of the oxirane ring to form a hydroxy ester, which reacts with the anhydrides to form the half acid. By either means, the oxide method provides a much faster reaction time than the use of glycols and control of the molecular weight of the product can be exercised by the quantity of the starting ingredients.

Although epoxides preferentially react with carboxyl groups at low temperatures, hydroxyl groups can react to form polyethers. The reaction is normally catalyzed with either lithium chloride, which gives primarily a polyester product, or with zinc chloride, which gives a mixture of polyester-polyether products. In the lithium chloride method, stoichiometric amounts of the oxides and anhydrides are used. Thus, the molecular weight of the polyester is controlled by the amount of initiator used. If the amount is high, several chains are started and the polymer molecular weight will be low. If small amounts of starter are used, few chains are started and the eventual molecular weight of the polyester will be high. Formation of polyester-polyether mixtures by using zinc chloride as the catalyst results in product toughness and flexibility caused by formation of dipropylene linkages in the polyester backbones. Higher amounts of oxide are used with zinc chloride to lower the eventual acid value of the polyester to a manageable level.

Isomerization of maleate to fumarate is achieved by subjecting the formed polyester to higher temperatures. Where $ZnCl_2$ is used as the catalyst, the higher temperatures must be applied carefully to avoid a large increase in viscosity or gelation. The viscosity of polyesters from LiCl appears to be more stable when they are heated for conversion to fumarates.

Because of the fast reaction or kettle cycle time and the lower cost on a mole bases of the oxides versus the corresponding glycols, high quality but very low cost, general-purpose polyester resins can be made by the oxide route. The disadvantage of this process is the limited number of compositions that can be made when either glycols or acids exceed 10 mol %. A further disadvantage of the oxide process is that it is difficult to maintain the color of the resin at low levels normally attained by the direct fusion process. Although the preparation of unsaturated polyester resins appears to be straight forward, never the less, there are several potential problems that pertain to the raw materials used to prepare certain compositions and the optimum conditions for polyesterification.

Unsaturated polyester resins that contain high melting acids of limited glycol solubility, eg, isophthalic or terephthalic acids, normally are prepared by a two-stage process to obtain resins of good clarity on prolonged storage. In the first stage, these acids react with a portion of the glycol to low-acid value, frequently below 15 mg KOH/g. In the second stage, the remainder of the glycol and the unsaturated moieties are added and esterification proceeds in the normal fashion.

Several glycols produce side products or add to the maleic or fumaric double bond under esterification conditions. Cyclic ethers can be produced easily from propylene glycol in the presence of strong acid catalysts, eg, methanesulfonic acid. Similarly, tetrahydrofuran can be generated from 1,4-butanediol and complex mixtures of low boiling products can be generated from 2,2,4-trimethyl-1,3-pentanediol under acid catalyzed esterification conditions. Reactions such as these account for the fact that polyesters usually are formulated with a small excess of glycol over the stoichiometrically required amounts.

The optimum esterification temperature for most unsaturated polyesters is ca 210° C. Below this temperature, isomerization of the maleic function is difficult to achieve and, at higher temperatures, partial loss of unsaturation resulting from glycol addition occurs. Where high concentration of polyether polyols are used, it is advisable that either lower temperatures be implemented or the polyester should be inhibited to prevent sharp increases in viscosity, especially near the latter stages of esterification.

The use of esterification catalysts can shorten the reaction time greatly in cases where the uncatalyzed reaction time is unusually long, eg, with high melting acids of limited glycol solubility, or where very low acid values are desired. No one catalyst is best on all situations, since there is a great deal of specificity between the polyester and the catalyst system. Tin compounds generally are good esterification catalysts, but tetrabutyl titanate, tetrabutyl zirconate, zirconium naphthenate, and mixtures of stannous oxalate and sodium acetate are claimed to be superior esterification catalysts.

The use of strong acid catalysts with the esterification of halogenated glycols or acid anhydrides, which can liberated small amounts on mineral acid during polyester preparation, can cause corrosion of the equipment. When this occurs, the resin tends to darken from iron contamination and its stability suffers even though the amount of iron is below 50 ppm. In isolated cases, iron or other heavy-metal contamination can be introduced by the raw materials.

Once the polyester is prepared according to a specific range of acid values and viscosities, it undergoes dissolution in a specific monomer to yield a specific solution viscosity and reactivity. Great care should be exercised not to overthin the polymer with the desired monomer nor to overinhibit it, since it is extremely difficult to correct for low viscosities and slow reactivities. The approach that is used widely is to withhold portions of the monomer and inhibitor from the specified amounts. Test results then are used for guidance as to final amounts of monomer and inhibitor that should be added to bring the resin within specifications.

The resin thus formed is dissolved in a monomer mixture of 2:1 styrene to methyl methacrylate where the total monomer comprises 30% of the total solution thus formed.

(2) Addition of a UV absorber, a polyfunctional crosslinker, a coupling agent and a hydroquinone stabilizer are added to respectively increase resistance to UV induced color changes, to accomplish a crosslinking of the resin make a dense and hard product, to improve bonding of the resin to the inorganic fillers employed, and to give the resin prolonged pot life in transit, storage and in process.

B. About 30–50% of alumina trihydrate to act as a fire retardant, a viscosity adjuster and an index matching filler to avoid masking the visuality of other filler components that lend to the proper appearance of the final product.

C. About 10–30% of various fillers such as ground or decomposed granite particles in a size range of 0.025" to 0.25", or a ground-up dust of a cured, colored polyester-alumina mix, in a 70–30 ratio, which has been screened to eliminate fines and retains the 0.025" to 0.25" portion, or a series of other siliceous fillers with particle sizes in the 0.25" to 0.25" range that impart a granite look or translucent particles in the 0.25" to 0.25" range that impart a marble appearance, or alumina particles in the 0.25" to 0.25" range.

D. About 1% of a peroxide that is stable at room temperature in the polyester mix with a ten hour half life (T/2) of 40° C. to 80° C., such as t-butylperoxyethylhexanoate or 2, 4-pentanedioneperoxide as examples.

E. Small amounts of pigments or dyes (of about 0.1% to impart a general shading to the polymer matrix as a background for the larger particles to produce various hues to simulate natural stones.

Provided is a series of castable compositions for producing the synthetic marble/granite products whereby the resin filler mix is pumpable, stable at room temperature, free of air bubbles and is ready to cast without further mixing or addition of additives.

Also provided is the process for the preparation of the resin and its delivery to molds or casting surfaces and its subsequent cure and post-cure to produce a simulated stone product that has superior properties and improved resistance to cyclic moisture tests such as the hot water cycling under ANSI.

It is noted that cast polyester marbles and granites require a gel coat to pass the hot water cycling requirements of ANSI; and acrylics, due to their color, mask the whitening but show failure mostly beyond the minimum number of cycles (500) cited under ANSI.

EXAMPLE 1

A. About 300 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Lupersol-224 or Witco-570 P (2,4 pentanedione peroxide) were added and stirred in.

F. About 300 grams of alumina trihydrate (30% by weight) from Reynolds with a particle size between 30 and 60 microns were added and stirred in.

G. About 400 grams of a filler with a particle size of 24 mils to ¼" largest diameter (40% by weight) produced by grinding a grey colored ingot of 70% alumina in 30% genral purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 2

A. About 300 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Witco 245 (t-butyl peroxyacetate) were added and stirred in.

F. About 300 grams of alumina trihydrate (30% by weight) from Reynolds with a particle size between 30 and 60 microns were added and stirred in.

G. About 400 grams of a filler with a particle size of 24 mils to ¼" largest diameter (40% by weight) produced by grinding a grey colored ingot of 70% alumina in 30% general purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 3

A. About 300 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Witco 570P 2ethyl hexanoylperoxy hexane were added and stirred in.

F. About 300 grams of alumina trihydrate (30% by weight) from Reynolds with a particle size between 30 and 60 microns were added and stirred in.

G. About 400 grams of a filler with a particle size of 24 mils to ¼" largest diameter (40% by weight) produced by grinding a grey colored ingot of 70% alumina in 30% general purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 4

A. About 400 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.4 grams of Tinuvin-P were added and stirred in.

C. About 0.4 grams of Dow 6030 were added and stirred in.

D. About 0.1 grams of EGDM (ethyleneglycol dimethacrylate) were added and stirred in.

E. About 3 grams or 1% by weight of resin of Lupersol-224 or Witco-570 P (2,4 pentanedione peroxide) were added and stirred in.

F. About 350 grams of alumina trihydrate (35% by weight) rom Reynolds with a particle size between 30 and 60 micron were added and stirred in.

G. About 350 grams of a filler with a particle size of 24 mils to ¼" largest diameter (35% by weight) produced by grinding a grey colored ingot of 70% alumina in 30% general purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 5

A. About 300 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Lupersol-224 or Witco-570 P (2,4 pentanedione peroxide) were added and stirred in.

F. About 400 grams of alumina trihydrate (40% by weight) from Reynolds with a particle size between 30 and 60 microns were added and stirred in.

G. About 300 grams of a filler with a particle size of 24 mils to ¼" largest diameter (30% by weight) produced by grinding a grey colored ingot of 70% alumina in 30% general purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 6

A. About 300 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Lupersol-224 or Witco-570 P (2,4 pentanedione peroxide) were added and stirred in.

F. About 450 grams of alumina trihydrate (45% by weight) from Reynolds with a particle size between 30 and 60 microns were added and stirred in.

G. About 250 grams of a filler with a particle size of 24 mils to ¼" largest diameter (25% by weight) produced by grinding a grey colored ingot of 70% alumina in 30% general purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 7

A. About 250 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.25 grams of Tinuvin-P were added and stirred in.

C. About 0.25 grams of Dow 6030 were added and stirred in.

D. About 0.05 grams of EGDM (ethyleneglycol dimethacrylate) were added and stirred in.

E. About 3 grams or 1% by weight of resin of Lupersol-224 or Witco-570 P (2,4 pentanedione peroxide) were added and stirred in.

F. About 350 grams of alumina trihydrate (35% by weight) from Reynolds with a particle size between 30 and 60 microns were added and stirred in.

G. About 400 grams of a filler with a particle size of 24 mils to ¼" largest diameter (40% by weight) produced by grinding a grey colored ingot of 70% alumina in 30% general purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the CUT edge or rear (upward) surfaces.

EXAMPLE 8

A. About 350 grams of a resin solution (35% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.35 grams of Tinuvin-P were added and stirred in.

C. About 0.35 grams of Dow 6030 were added and stirred in.

D About 0.1 grams of EGDM (ethyleneglycol dimethacrylate) were added and stirred in.

E. About 3 grams or 1% by weight of resin of Lupersol-224 or Witco-570 P (2,4 pentanedione peroxide) were added and stirred in.

F. About 300 grams of alumina trihydrate (30% by weight) from Reynolds with a particle size between 30 and 60 microns were added and stirred in.

G. About 350 grams of a filler with a particle size of 24 mils to ¼" largest diameter (35% by weight) produced by grinding a grey colored ingot of 70% alumina in 30% general purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 9

A. About 30 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Lupersol-224 or Witco-570 P (2,4 pentanedione peroxide) were added and stirred in.

F. About 300 grams of alumina trihydrate (30% by weight) from Reynolds with a particle size between 30 and 60 microns were added and stirred in.

G. About 400 grams of a filler with a particle size of 24 mils to ¼" largest diameter (40% by weight) produced by grinding a black colored ingot of 70% alumina in 30% general purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size.

The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 10

A. About 300 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Lupersol-224 or Witco-570 P (2,4 pentanedione peroxide) were added and stirred in.

F. About 300 grams of alumina trihydrate (30% by weight) from Reynolds with a particle size between 30 and 60 microns were added and stirred in.

G. About 400 grams of a filler with a particle size of 24 mils to ¼" largest diameter (40% by weight) produced by grinding a mix of 50% black colored ingot and 50% grey colored ingot each of 70% alumina in 30% general purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 11

A. About 300 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Lupersol-224 or Witco-570 P (2,4 pentanedione peroxide) were added and stirred in.

F. About 300 grams of alumina trihydrate (30% by weight) from Reynolds with a particle size between 30 and 60 microns were added and stirred in.

G. About 400 grams of a filler with a particle size of 24 mils to ¼" largest diameter (40% by weight) produced by grinding a mix of 25% black colored ingot and 75% grey colored ingot each of 70% alumina in 30% general purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the CUT edge or rear (upward) surfaces.

EXAMPLE 12

A. About 300 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Lupersol-224 or Witco-570 P (2,4 pentanedione peroxide) were added and stirred in.

F. About 300 grams of alumina trihydrate (30% by weight) from Reynolds with a particle size between 30 and 60 microns were added and stirred in.

G. About 400 grams of a filler with a particle size of 24 mils to ¼" largest diameter (40% by weight) produced by grinding a mix of 20% brown colored ingot, 60% grey colored ingot and 20% black colored ingot (to produce varigated appearance) each of 70% alumina in 30% general purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 13

A. About 300 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Lupersol-224 or Witco-570 P (2,4 pentanedione peroxide) were added and stirred in.

F. About 300 grams of alumina trihydrate (30% by weight) from Reynolds with a particle size between 30 and 60 microns were added and stirred in.

G. About 400 grams of a filler with a particle size of 24 mils to ¼" largest diameter (40% by weight) produced by grinding a black colored ingot of 70% alumina in 30% general purpose polyester followed by screening to get particle sizes of 24 mils to ¼" was added and stirred in.

H. A small amount of blue dye of about 0.01% was added and stirred in.

I. The total mixture was placed in a stirred, cooled, vacuum vessel where air was removed while continuously stirring for a period of over one hour and up to 24 hours without perceptible increase in viscosity demonstrating no polymerization of the resin matrix.

J. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 14

A. About 300 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Lupersol-224 or Witco-570 P (2,4 pentanedione peroxide) were added and stirred in.

F. About 300 grams of alumina trihydrate (30% by weight) from Reynolds with a particle size between 30 and 60 microns were added and stirred in.

G. About 400 grams of a filler with a particle size of 24 mils to ¼" largest diameter (40% by weight) produced by grinding a grey colored ingot of 70% alumina in 30% general purpose polyester followed by screening to get particle sizes of 24 mils to ¼" was added and stirred in.

H. A small amount of blue dye of about 0.01% was added and stirred in.

I. The total mixture was placed in a stirred, cooled, vacuum vessel where air was removed while continuously stirring for a period of over one hour and up to 24 hours without perceptible increase in viscosity demonstrating no polymerization of the resin matrix.

J. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 15

A. About 300 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Lupersol-224 or Witco-570 P (2,4 pentanedione peroxide) were added and stirred in.

F. About 300 grams of alumina trihydrate (30% by weight) from Reynolds with a particle size between 30 and 60 microns were added and stirred in.

G. About 400 grams of a filler with a particle size of 24 mils to ¼" largest diameter (40% by weight) produced by grinding a grey colored ingot of 70% alumina in 30% general purpose polyester followed by screening to get particle sizes of 24 mils to ¼" was added and stirred in.

H. A small amount of red dye of about 0.01% was added and stirred in.

I. The total mixture was placed in a stirred, cooled, vacuum vessel where air was removed while continuously stirring for a period of over one hour and up to 24 hours without perceptible increase in viscosity demonstrating no polymerization of the resin matrix.

J. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 16

A. About 300 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Luperpersol-224 or Witco-570 P (2,4 pentanedione peroxide) were added and stirred in.

F. About 300 grams of alumina trihydrate (30% by weight) from Reynolds with a particle size between 30 and 60 microns were added and stirred in.

G. About 400 grams of a filler with a particle size of 24 mils to ¼" largest diameter (40% by weight) produced by grinding a grey colored ingot of 70% alumina in 30% general purpose polyester followed by screening to get particle sizes of 24 mils to ¼" was added and stirred in.

H. A small amount of yellow dye of about 0.01% was added and stirred in.

I. The total mixture was placed in a stirred, cooled, vacuum vessel where air was removed while continuously stirring for a period of over one hour and up to 24 hours without perceptible increase in viscosity demonstrating no polymerization of the resin matrix.

J. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the CUT edge or rear (upward) surfaces.

EXAMPLE 17

A. About 250 grams of a resin solution (25% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.25 grams of Tinuvin-P were added and stirred in.

C. About 0.25 grams of Dow 6030 were added and stirred in.

D. About 0.05 grams of EGDM (ethyleneglycol dimethacrylate) were added and stirred in.

E. About 2.5 grams or 1% by weight of resin of Luperpersol- 224 or Witco-570 P (2,4 pentanedione peroxide) were added and stirred in.

F. About 350 grams of alumina trihydrate (35% by weight) from Reynolds with a particle size between 30 and 60 microns were added and stirred in.

G. About 400 grams of a filler with a particle size of 24 mils to ¼" largest diameter (40% by weight) produced by grinding a natural stone (soft decomposing granite composed of predominantly white and black crystals) obtained from Western Mexico, as an example, followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size using a carbide saw. The surface was smooth, hard and had the appearance of a random synthetic granite or quartzite. The residual monomer was less than 0.1% and there were no entrapped bubbles or pockets visible on the cut edge or rear (upward) surfaces.

A. About 250 grams of a resin solution (25% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.25 grams of Tinuvin-P were added and stirred in.

C. About 0.25 grams of Dow 6030 were added and stirred in.

D. About 0.05 grams of EGDM (ethyleneglycol dimethacrylate) were added and stirred in.

E. About 2.5 grams or 1% by weight of resin of Luperpersol-224 or Witco-570 P (2,4 pentanedione peroxide) were added and stirred in.

F. About 350 grams of alumina trihydrate (35% by weight) from Reynolds with a particle size between 30 and 60 microns were added and stirred in.

G. About 400 grams of a filler with a particle size of 24 mils to ¼" largest diameter (40% by weight) produced by grinding a natural stone (soft decomposing grantie composed predominantly of tan and black crystals) followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size using a carbide saw. The surface was smooth, hard and had the appearance of a random synthetic granite or quartzite. The residual monomer was less than 0.1% and there were no entrapped bubbles or pockets visible on the CUT edge or rear (upward) surfaces.

EXAMPLE 19

A. About 250 grams of a resin solution (25% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.25 grams of Tinuvin-P were added and stirred in.

C. About 0.25 grams of Dow 6030 were added and stirred in.

D. About 0.05 grams of EGDM (ethyleneglycol dimethacrylate) were added and stirred in.

E. About 2.5 grams or 1% by weight of resin of Luperpersol-224 or Witco-570 P (2,4 pentanedione peroxide) were added and stirred in.

F. About 350 grams of alumina trihydrate (35% by weight) from Reynolds with a particle size between 30 and 60 microns were added and stirred in.

G. About 400 grams of a filler with a particle size of 24 mils to ¼" largest diameter (40% by weight) produced by grinding a natural stone (soft decomposing granite predominantly of gray and black crystals) followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size with a carbide saw. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 20

A. About 250 grams of a resin solution (25% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.25 grams of Tinuvin-P were added and stirred in.

C. About 0.25 grams of Dow 6030 were added and stirred in.

D. About 0.05 grams of EGDM (ethyleneglycol dimethacrylate) were added and stirred in.

E. About 2.5 grams or 1% by weight of resin of Luperpersol-224 or Witco-570 P (2,4 pentanedione peroxide) were added and stirred in.

F. About 350 grams of alumina trihydrate (35% by weight) from Reynolds with a particle size between 30 and 60 microns were added and stirred in.

G. About 400 grams of a filler with a particle size of 24 mils to ¼" largest diameter (40% by weight) produced by grinding a natural stone (soft decomposing granite predominantly of brown, white and black crystals) followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size with a carbide saw. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 21

A. About 250 grams of a resin solution (25% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.25 grams of Tinuvin-P were added and stirred in.

C. About 0.25 grams of Dow 6030 were added and stirred in.

D. About 0.05 grams of EGDM (ethyleneglycol dimethacrylate) were added and stirred in.

E. About 2.5 grams or 1% by weight of resin of Luperpersol-224 or Witco-570 P (2,4 pentanedione peroxide) were added and stirred in.

F. About 350 grams of alumina trihydrate (35% by weight) from Reynolds with a particle size between 30 and 60 microns were added and stirred in.

G. About 400 grams of a filler with a particle size of 24 mils to ¼" largest diameter (40% by weight) produced by grinding a natural stone (soft decomposing granite predominantly of orange, white and black crystals) followed by screening to get particle sizes of 24 misl to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size with a carbide saw. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 22

A. About 250 grams of a resin solution (25% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.25 grams of Tinuvin-P were added and stirred in.

C. About 0.25 grams of Dow 6030 were added and stirred in.

D. About 0.05 grams of EGDM (ethyleneglycol dimethacrylate) were added and stirred in.

E. About 2.5 grams or 1% by weight of resin of Luperpersol-224 or Witco-570 P (2,4 pentanedione peroxide) were added and stirred in.

F. About 350 grams of alumina trihydrate (35% by weight) from Reynolds with a particle size between 30 and 60 microns were added and stirred in.

G. About 400 grams of a filler with a particle size of 24 mils to ¼" largest diameter (40% by weight) produced by grinding a natural stone (soft decomposing granite predominantly of tan and gray crystals) followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size with a carbide saw. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 23

A. About 250 grams of a resin solution (25% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.25 grams of Tinuvin-P were added and stirred in.

C. About 0.25 grams of Dow 6030 were added and stirred in.

D. About 0.05 grams of EGDM (ethyleneglycol dimethacrylate) were added and stirred in.

E. About 2.5 grams or 1% by weight of resin of Luperpersol-224 or Witco-570 P (2,4 pentanedione peroxide) were added and stirred in.

F. About 350 grams of alumina trihydrate (35% by weight) from Reynolds with a particle size between 30 and 60 microns were added and stirred in.

G. About 400 grams of a filler with a particle size of 24 mils to ¼" largest diameter (40% by weight) produced by grinding a natural stone (soft decomposing granite containing a variety of complex colored crystals) followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size using a carbide saw. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 24

A. About 250 grams of a resin solution (25% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.25 grams of Tinuvin-P were added and stirred in.

C. About 0.25 grams of Dow 6030 were added and stirred in.

D. About 0.05 grams of EGDM (ethyleneglycol dimethacrylate) were added and stirred in.

E. About 2.5 grams or 1% by weight of resin of Luperpersol- 224 or Witco-570 P (2,4 pentanedione peroxide) were added and stirred in.

F. About 350 grams of alumina trihydrate (35% by weight) from Reynolds with a particle size between 30 and 60 microns were added and stirred in.

G. About 400 grams of a filler with a particle size of 24 mils to ¼" largest diameter (40% by weight) produced by grinding a natural stone (soft decomposing granite containing predominantly translucent particles) followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size using a carbide saw. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 25

A. About 250 grams of a resin solution (25% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.25 grams of Tinuvin-P were added and stirred in.

C. About 0.25 grams of Dow 6030 were added and stirred in.

D. About 0.05 grams of EGDM (ethyleneglycol dimethacrylate) were added and stirred in.

E. About 2.5 grams or 1% by weight of resin of Luperpersol-224 or Witco-570 P (2,4 pentanedione peroxide) were added and stirred in.

F. About 350 grams of alumina trihydrate (35% by weight) from Reynolds with a particle size between 30 and 60 microns were added and stirred in.

G. About 400 grams of a filler with a particle size of 24 mils to ¼" largest diameter (40% by weight) produced by grinding a natural stone (soft decomposing granite predominatley gray containing a large amount of mica) followed by screening to get particle sizes of 24 misl to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size using a carbide saw. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 26

A. About 250 grams of a resin solution (25% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.25 grams of Tinuvin-P were added and stirred in.

C. About 0.25 grams of Dow 6030 were added and stirred in.

D. About 0.05 grams of EGDM (ethyleneglycol dimethacrylate) were added and stirred in.

E. About 25 grams or 1% by weight of resin of Luperpersol-224 or Witco-570 P (2,4 pentanedione peroxide) were added and stirred in.

F. About 350 grams of alumina trihydrate (35% by weight) from Reynolds with a particle size between 30 and 60 microns were added and stirred in.

G. About 400 grams of a filler with a particle size of 24 mils to ¼" largest diameter (40% by weight) produced by grinding a natural stone (soft decomposing granite composed of predominantly white and black crystals) followed by screening to get particle sizes of 24 mils to ¼" was added and stirred in.

H. A small amount of blue dye or about 0.01% was added and stirred in.

I. The total mixture was placed in a stirred, cooled, vacuum vessel where air was removed while continuously stirring for a period of over one hour and up to 24 hours without perceptible increase in viscosity demonstrating no polymerization of the resin matrix.

J. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size with a carbide saw. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 27

A. About 250 grams of a resin solution (25% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.25 grams of Tinuvin-P were added and stirred in.

C. About 0.25 grams of Dow 6030 were added and stirred in.

D. About 0.05 grams of EGDM (ethyleneglycol dimethacrylate) were added and stirred in.

E. About 2.5 grams or 1% by weight of resin of Luperpersol-224 or Witco-570 P (2,4 pentanedione peroxide) were added and stirred in.

F. About 350 grams of alumina trihydrate (35% by weight) from Reynolds with a particle size between 30 and 60 microns were added and stirred in.

G. About 400 grams of a filler with a particle size of 24 mils to ¼" largest diameter (40% by weight) produced by grinding a natural stone (soft decomposing granite composed of predominantly white and black crystals) followed by screening to get particle sizes of 24 mils to ¼" was added and stirred in.

H. A small amount of a red dye of about 0.01% was added and stirred in.

I. The total mixture was placed in a stirred, cooled, vacuum vessel where air was removed while continuously stirring for a period of over one hour and up to 24 hours without perceptible increase in viscosity demonstrating no polymerization of the resin matrix.

J. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size with a carbide saw. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 28

A. About 250 grams of a resin solution (25% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.25 grams of Tinuvin-P were added and stirred in.

C. About 0.25 grams of Dow 6030 were added and stirred in.

D. About 0.05 grams of EGDM (ethyleneglycol dimethacrylate) were added and stirred in.

E. About 2.5 grams or 1% by weight of resin of Luperpersol-224 or Witco-570 P (2,4 pentanedione peroxide) were added and stirred in.

F. About 350 grams of alumina trihydrate (35% by weight) from Reynolds with a particle size between 30 and 60 microns were added and stirred in.

G. About 400 grams of a filler with a particle size of 24 mils to ¼" largest diameter (40% by weight) produced by grinding a natural stone (soft decomposing granite composed of predominantly white and black crystals) followed by screening to get particle sizes of 24 mils to ¼" was added and stirred in.

H. A small amount of a yellow dye of about 0.01% was added and stirred in.

I. The total mixture was placed in a stirred, cooled, vacuum vessel where air was removed while continuously stirring for a period of over one hour and up to 24 hours without perceptible increase in viscosity demonstrating no polymerization of the resin matrix.

J. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the CUT edge or rear (upward) surfaces.

EXAMPLE 29

A. About 250 grams of a resin solution (25% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.25 grams of Tinuvin-P were added and stirred in.

C. About 0.25 grams of Dow 6030 were added and stirred in.

D. About 0.05 grams of EGDM (ethyleneglycol dimethacrylate) were added and stirred in.

E. About 2.5 grams or 1% by weight of resin of WITCO 245 (t-butyl peroxyacetate) were added and stirred in.

F. About 350 grams of alumina trihydrate (35% by weight) from Reynolds with a particle size between 30 and 60 microns were added and stirred in.

G. About 400 grams of a filler with a particle size of 24 mils to ¼" largest diameter (40% by weight) produced by grinding a natural stone (soft decomposing granite composed of predominantly black and white crystals) followed by screening to get particle sizes of 24 mils to ¼" was added and stirred in.

H. A small amount of red dye of about 0.01% was added and stirred in.

I. The total mixture was placed in a stirred, cooled, vacuum vessel where air was removed while continuously stirring for a period of over one hour and up to 24 hours without perceptible increase in viscosity demonstrating no polymerization of the resin matrix.

J. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size with a carbide saw. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 30

A. About 250 grams of a resin solution (25% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.25 grams of Tinuvin-P were added and stirred in.

C. About 0.25 grams of Dow 6030 were added and stirred in.

D. About 0.05 grams of EGDM (ethyleneglycol dimethacrylate) were added and stirred in.

E. About 2.5 grams or 1% by weight of resin of Lupersol 575 (t-amylperoxyethylhexanoate) were added and stirred in.

F. About 350 grams of alumina trihydrate (35% by weight) from Reynolds with a particle size between 30 and 60 microns were added and stirred in.

G. About 400 grams of an additional filler with a particle size of 24 mils to ¼" largest diameter (40% by weight) produced by grinding a natural stone, such as a soft decomposing granite composed of predominantly white and black crystals, followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size with a carbide saw. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 31

A. About 300 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Lupersol-224 or Witco-570 P (2,4 pentanedione peroxide) were added and stirred in.

F. About 350 grams of alumina trihydrate (35% by weight) from Reynolds with a particle size between 30 and 60 microns were added and stirred in.

G. About 350 grams of a filler with a particle size of 24 mils to ¼" largest diameter (35% by weight) produced by grinding a grey colored ingot of 70% alumina in 30% general purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch. Using a steel roller, a backing sheet of cellophane was applied to the upper face of the open mold to cover the surface and give a smooth finished back. The mold was then transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 32

A. About 250 grams of a resin solution (25% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.25 grams of Tinuvin-P were added and stirred in.

C. About 0.25 grams of Dow 6030 were added and stirred in.

D. About 0.05 grams of EGDM (ethyleneglycol dimethacrylate) were added and stirred in.

E. About 2.5 grams or 1% by weight of resin of Luperpersol-224 or Witco-570 P (2,4 pentanedione peroxide) were added and stirred in.

F. About 350 grams of alumina trihydrate (35% by weight) from Reynolds with a particle size between 30 and 60 microns were added and stirred in.

G. About 400 grams of a filler with a particle size of 24 mils to ¼" largest diameter (40% by weight) produced by grinding a natural stone (soft decomposing granite composed of predominantly white and black crystals) followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold to a thickness of about three quarter inch. Using a steel roller, a backing sheet of cellophane was applied to the upper face of the open mold to cover the surface and give a smooth finished back. The mold was then transported through an oven at 180° F. for 40 minutes then through a zone at 240° F. for 20 minutes.

The resultant casting was cooled, removed from the pre-treated mold without difficulty and trimmed to size with a carbide saw. The surface was smooth, hard and had the appearance of a random synthetic granite or quartzite. The residual monomer was less than 0.1% and there were no entrapped bubbles or pockets visible on the CUT edge or rear (upward) surfaces.

EXAMPLE 33

A. About 300 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Luperpersol-224 or Witco-570 P (2,4 pentanedione peroxide) were added and stirred in.

F. About 300 grams of alumina trihydrate (30% by weight) from Reynolds with a particle size between 30 and 60 microns were added and stirred in.

G. About 400 grams of a filler with a particle size of 24 mils to ¼" largest diameter (40% by weight) produced by grinding a grey colored ingot of 70% alumina in 30% general purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold, where the base of the mold is aluminum in place of steel, to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 34

A. About 300 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Luperpersol-224 or Witco-570 P (2,4 pentanedione peroxide) were added and stirred in.

F. About 300 grams of alumina trihydrate (30% by weight) from Reynolds with a particle size between 30 and 60 microns were added and stirred in.

G. About 400 grams of a filler with a particle size of 24 mils to ¼" largest diameter (40% by weight) produced by grinding a grey colored ingot of 70% alumina in 30% general purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold, where the base of the molde is glass reinforced cured polyester sheet instead of steel or aluminum, to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 35

A. About 300 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Lupersol-224 or Witco-570 P (2,4 pentanedione peroxide) were added and stirred in.

F. About 300 grams of alumina trihydrate (30% by weight) from Reynolds with a particle size between 30 and 60 microns were added and stirred in.

G. About 400 grams of a filler with a particle size of 24 mils to ¼" largest diameter (40% by weight) produced by grinding a grey colored ingot of 70% alumina in 30% general purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a square cavity mold, where the base is a matte finished teflon coated metal sheet, to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a random synthetic granite or quartzite. The residual monomer was less than 0.1% and there were no entrapped bubbles or pockets visible on the cut edge or rear (upward) surfaces.

EXAMPLE 36

A. About 3000 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 3.0 grams of Tinuvin-P were added and stirred in.

C. About 3.0 grams of Dow 6030 were added and stirred in.

D. About 1.0 grams of EGDM (ethyleneglycol dimethacrylate) were added and stirred in.

E. About 30 grams or 1% by weight of resin of Luperpersol-224 or Witco-570 P (2,4 pentanedione peroxide) were added and stirred in.

F. About 3000 grams of alumina trihydrate (30% by weight) from Reynolds with a particle size between 30 and 60 microns were added and stirred in.

G. About 4000 grams of a filler with a particle size of 24 mils to ¼" largest diameter (40% by weight) produced by grinding a grey colored ingot of 70% alumina in 30% general purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a bowl shaped closed mold with a matching top having a clearance of about three quarter inch filling it to the top or the input port, and transported through an oven at 180° F. for 40 minutes then through a zone at 240° F. for 20 minutes.

The resultant casting was cooled, removed from the pre-treated mold without difficulty. The surfaces were smooth, hard and had the appearance of a random synthetic granite or quartzite. The residual monomer was less than 0.1% and the edges and surfaces appeared free of bubbles or holes.

EXAMPLE 37

A. About 5000 grams of a resin solution (25% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 5.0 grams of Tinuvin-P were added and stirred in.

C. About 5.0 grams of Dow 6030 were added and stirred in.

D. About 0.2 grams of EGDM (ethyleneglycol dimethacrylate) were added and stirred in.

E. About 50 grams or 1% by weight of resin of Luperpersol- 224 or Witco-570 P (2,4 pentanedione peroxide) were added and stirred in.

F. About 7000 grams of alumina trihydrate (35% by weight) from Reynolds with a particle size between 30 and 60 microns were added and stirred in.

G. About 4000 grams of a filler with a particle size of 24 mils to ¼" largest diameter (40% by weight) produced by grinding a grey colored ingot of 70% alumina in 30% general purpose polyester followed by screening to get particle sizes of 24 mils to ¼" was added and stirred in.

H. The total mixture was placed in a stirred, cooled, vacuum vessel where air was removed while continuously stirring for a period of over one hour and up to 24 hours without perceptible increase in viscosity demonstrating no polymerization of the resin matrix.

I. The homogeneous mixture was then poured into a bowl shaped closed mold with a matching top having a clearance of about three quarter inch and filling it to the top of the input port, and transported through an oven at 180° F. for 40 minutes then through a zone at 240° F. for 20 minutes.

The resultant casting was cooled, removed from the pre-treated mold without difficulty. The surface was smooth, hard and had the appearance of a random synthetic granite or quartzite. The residual monomer was less than 0.1% and the edges and surfaces appeared free of bubbles or holes.

EXAMPLE 38

A. About 300 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.3 grams of Tinuvin-P were added and stirred in.

C. About 0.3 grams of Dow 6030 were added and stirred in.

D. About 0.1 grams of EGDM (ethyleneglycol dimethacrylate) were added and stirred in.

E. About 3 grams or 1% by weight of resin of Lupersol-224 or Witco-570 P (2,4 pentanedione peroxide) were added and stirred in.

F. About 300 grams of alumina trihydrate (30% by weight) from Reynolds with a particle size between 30 and 60 microns were added and stirred in.

G. About 400 grams of a filler with a particle size of 24 mils to ¼" largest diameter (40% by weight) produced by grinding a grey colored ingot of 70% alumina in 30% general purpose polyester followed by screening to get particle sizes of 24 mils to ¼" was added and stirred in.

H. A small amount of blue dye of about 0.01% was added and stirred in.

I. The total mixture was placed in a stirred, cooled, vacuum vessel where air was removed while continuously stirring for a period of over one hour and up to 24 hours without perceptible increase in viscosity demonstrating no polymerization of the resin matrix.

J. The homogeneous mixture was then poured into a bowl shaped closed cavity mold with a matching top having a clearance of about three quarter inch and filling it to the top of the input port, and transported through an oven at 180° F. for 40 minutes then through a zone at 240° F. for 20 minutes.

The resultant casting was cooled, removed from the pre-treated mold without difficulty. The surface was smooth, hard and had the appearance of a random synthetic granite or quartzite. The residual monomer was less than 0.1% and the edges and surfaces appeared free of bubbles or holes.

EXAMPLE 39

A. About 600 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.6 grams of Tinuvin-P were added and stirred in.

C. About 0.6 grams of Dow 6030 were added and stirred in.

D. About 0.1 grams of EGDM (ethyleneglycol dimethacrylate) were added and stirred in.

E. About 6 grams or 1% by weight of resin of Lupersol-224 or Witco-570 P (2,4 pentanedione peroxide) were added and stirred in.

F. About 600 grams of alumina trihydrate (30% by weight) from Reynolds with a particle size between 30 and 60 microns were added and stirred in.

G. To about one half (600 grams) of the resultant mix, about 400 grams of a filler with a particle size of 24 mils to ¼" largest diameter (40% by weight) produced by grinding a grey colored ingot of 70% alumina in 30% general purpose polyester followed by screening to get particle sizes of 24 mils to ¼" was added and stirred in. To the other half, about 400 grams of a filler with a particle size of 24 mils to ¼" largest diameter (40% by weight) produced by grinding a black colored ingot of 70% alumina in 30% general purpose polyester followed by screening to get particle sizes of 24 mils to ¼" was added and stirred in.

H. Each mixture was placed in a separate stirred, cooled, vacuum vessel where air was removed while continuously stirring for a period of over one hour and up to 24 hours without perceptible increase in viscosity demonstrating no polymerization of the resin matrix.

I. The two mixtures were intermixed with partial stirring to give a veined effect without achieving intimate mixing. The marbalized mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a randomly veined course marble. The residual monomer was less than 0.1% and there were no entrapped bubbles or pockets visible on the cut edge or rear (upward) surfaces.

EXAMPLE 40

A. About 600 grams of a resin solution (30% by weight) containing 70% by weight of polyester prepared from NPG-isophthalic and PG-orthophthalic polymers formed as co-polymers by commercial addition processes with 20% by weight of styrene and 10% by weight of MMA (methylmethacrylate) at a viscosity of about 600 cps was added to a vacuum vessel.

B. About 0.6 grams of Tinuvin-P were added and stirred in.

C. About 0.6 grams of Dow 6030 were added and stirred in.

D. About 0.1 grams of EGDM (ethyleneglycol dimethacrylate) were added and stirred in.

E. About 6 grams or 1% by weight of resin of Lupersol-224 or Witco-570 P (2,4 pentanedione peroxide) were added and stirred in.

F. About 600 grams of alumina trihydrate (30% by weight) from Reynolds with a particle size between 30 and 60 microns were added and stirred in.

G. To about one half (600 grs) of the resulting mix, about 400 grams of a filler with a particle size of 24 mils to ¼" largest diameter (40% by weight) produced by grinding a grey colored ingot of 70% alumina in 30% general purpose polyester followed by screening to get particle sizes of 24 mils to ¼" was added and stirred in. To the other half, about 400 grams of filler with a particle size of 24 mils to ¼" largest diameter (40% by weight) produced by grinding a grey colored ingot of 70% alumina in 30% general purpose polyester followed by screening to get particle sizes of 24 mils to ¼" was added and stirred in with an addition of a blue dye of about 0.01%.

H. Each was placed in a separate stirred, cooled, vacuum vessel where air was removed while continuously stirring for a period of over one hour and up to 24 hours without perceptible increase in viscosity demonstrating no polymerization of the resin matrix.

I. The two mixtures were intermixed with partial stirring to give a veined effect without achieving intimate mixing. The marbalized mixture was then poured into a square cavity mold to a thickness of about three quarter inch and transported through an oven at 180° F. for 40 minutes then through a zone at 240° F. for 20 minutes.

The resultant casting was cooled, removed from the pre-treated mold without difficulty and trimmed to size. The surface was smooth, hard and had the appearance of a randomly veined coarse marble. The residual monomer was less than 0.1% and there were no entrapped bubbles or pockets visible on the edge or rear (upward) surfaces.

While specific examples of the invention have been described in detail to illustrate the application of the principals of the invention, it will be understood that the invention may be embodied otherwise without departing from such principals.

What is claimed is:

1. A polyester resin to be used in making synthetic quartzite-marble/granite, comprising: a mix of neopentyl glycol-isophthalic and propylene glycol orthophthalic resin; said mix of neopentyl glycol-isophthalic and propylene glycol-orthophthalic resin includes a 75% mix of orthophthalic acid and 25% isophthalic acid (portions by weight) that is added to fumaric acid and anhydride and maleic acid anhydride and reacted with propylene glycol and neopentyl glycol in a 50/50 ratio such that the aromatic anhydride mix is 75% of the total aromatic/aliphatic anhydride concentration and such that the total acid and anhydrides are 75% of the total anhydride/polyhydric alcohol content.

2. The polyester resin according to claim 1, wherein said mix of neopentyl glycol and propylene glycol resins forms a solution with a monomer mixture of 2:1 styrene to methyl methacrylate where the total monomer comprises 30% of the solution.

3. A synthetic quartzite-marble/granite article comprising
40% to 70% by weight of a solution including a polyester resin comprised of acids and glycols, said polyester resin being dissolved in a monomer mixture of 2:1 styrene to methyl methacrylate where the total monomer comprises 30% of the solution, 30% to 50% of alumina trihydrate having a particle size of between 30 and 60 microns; 10% to 30% of an additional filler, said additional filler having a size range of 24 mils to ¼"; said polyester resin includes a mix of neopentyl glycol and propylene glycol resin; said mix of neopentyl glycol and propylene glycol resin comprises a 75% by weight mix of orthophthalic acid and 25% isophthalic acid (portions by weight) that is added to fumaric acid anhydride and maleic acid anhydride and reacted with propylene glycol and neopentyl glycol in a 50/50 ratio such that the aromatic anhydride mix is 75% by weight of the total of all the aromatic anhydride and aliphatic anhydride concentration and such that the total acid and anhydrides are 75% of the total anhydride/polyhydric alcohol content.

4. A synthetic quartzite-marble/granite article according to claim 3, further comprising: approximately 1% of a peroxide that is stable at room temperature.

5. A synthetic quartzite-marble/granite article according to claim 4, wherein said peroxide is t-butylperoxyethylhexanoate.

6. A synthetic quartzite-marble/granite article according to claim 4, wherein said peroxide is 2,4-pentanedioneperoxide.

7. A synthetic quartzite-marble/granite article according to claim 3, further comprising: a small amount of a pigment or dye.

8. A synthetic quartzite-marble/granite article according to claim 3, comprising from 25% to 35% of said polyester resin.

9. A synthetic quartzite-marble/granite article according to claim 3, comprising from 65% to 70% of said filler.

10. A synthetic quartzite-marble/granite article according to claim 3, wherein said filler includes at least first and second separate components.

11. A synthetic quartzite-marble/granite article comprising:
a resin solution containing 70% by weight of polyester prepared from NPG-isophthalic and PG-orthophthalic polymers, said resin solution containing 30% by weight of a monomer mixture of 2:1 styrene to methyl methacrylate; said resin being dissolved in said monomer mixture; including a peroxide, UV absorber, a polyfunctional crosslinker, a coupling agent, and a hydroquinone stabilizer; alumina trihydrate being added as a first filler; and being 30 to 50% by weight of the mixture; and an additional filler including at least one of a soft naturally occurring decomposing granite, ground granite particles of sizes 100–400 $\mu$ and residual fines from the cutting and processing of granite slabs, said additional filler being added and being 10% to 30% by weight of the mixture.

12. A synthetic quartzite-marble/granite article according to claim 11 wherein the peroxide is one of LUPERSOL-224 and WITCO 570P, WITCO-245.

13. A synthetic quartzite-marble/granite article according to claim 11, wherein said peroxide makes up approximately 1% of the mixture.

14. A synthetic quartzite-marble/granite article according to claim 11, wherein said UV absorber is TINUVIN-P.

15. A synthetic quartzite-marble/granite article according to claim 11, wherein said coupling agent is DOW 6030.

16. A synthetic marble or granite material comprising:
a mixed polyester backbone resin dissolved in a monomer to provide a resin solution 30 to 50% by weight; alumina trihydrate particles of size from 30 to 60 microns, added to the resin solution when said resin solution is a viscosity of approximately 600 cps; a UV light absorber being added; a coupling agent, added to said solution; a peroxide, added to said solution; a filler having particle sizes of 24 mils to ¼", mixed into said resin solution; said resin solution is formed by a mix of neopentyl glycol and propylene glycol said mix includes a 75% mix of orthophthalic acid and 25% by weight of isophthalic acid that is added to fumaric acid and anhydride and maleic anhydride reacted with propylene glycol and neopentyl glycol in a 50/50 ratio such that the aromatic anhydride mix is 70% of the total aromatic compounds and aliphatic compounds.

17. A process for forming a synthetic quartzite-marble/granite article, comprising the steps of:
mixing 40% to 70% by weight of a mixture including a mixed monomer polyester resin absorbed in a monomer mixture of 2:1 styrene to metha-methacrylate where the total monomer comprises 30% by weight of the total solution thus formed; adding to the solution 30% to 50% by weight of alumina trihydrate as a first filler and mixing the additive into the solution; adding 10% to 30% by weight of a second filler, the filler having a size range of 24 mils to ¼" and being held in suspension by the first filler mixing into the solution to form a mixture; pouring the mixture into a mold; and curing the mixture, in the mold, thermally; said polyester resin is formed by providing a 75% mix of orthophthalic acid and 25% isophthalic acid (portions by weight) and adding it to fumaric acid anhydride and maleic acid anhydride and reacting the mixture with propylene glycol and neopentyl glycol in a 50/50 ratio such that the aromatic anhydride mix is 75% of the total aromatic/aliphatic anhydride concentration and such that the total acid and anhydrides are 75% of the total anhydride/polyhydric alcohol content.

18. A process according to claim 17, further comprising: adding approximately 1% of a peroxide that is stable at room temperature.

19. A process according to claim 17, further comprising: adding an amount of a pigment or dye less than 0.1% by weight to the mixture, prior to curing.

* * * * *